United States Patent

[11] 3,603,460

[72] Inventor Robert J. Notes
Adrian, Mich.
[21] Appl. No. 858,067
[22] Filed Sept. 15, 1969
[45] Patented Sept. 7, 1971
[73] Assignee Lyle W. Roeder
Adrian, Mich.
a part interest

[54] APPARATUS FOR STORING PHONOGRAPH RECORDS
9 Claims, 6 Drawing Figs.

[52] U.S. Cl. .......... 211/40, 312/8
[51] Int. Cl. .......... A47g 29/00
[50] Field of Search .......... 211/40; 312/8, 9, 10, 13, 14, 15

[56] References Cited
UNITED STATES PATENTS

| | | | |
|---|---|---|---|
| 1,335,967 | 4/1920 | Howard | 312/8 |
| 1,914,564 | 6/1933 | Grandjean | 211/40 X |
| 2,281,845 | 5/1942 | Kaplan | 211/40 |
| 2,825,465 | 3/1958 | Burgo | 211/40 |
| 3,084,983 | 4/1963 | Stuart | 312/13 |
| 3,391,792 | 7/1968 | Makar | 211/40 |

*Primary Examiner*—Nile C. Byers, Jr.
*Attorney*—Allen D. Gutchess, Jr.

ABSTRACT: A phonograph record storage container includes a frame with a plurality of parallel, elongate supports at the bottom thereof to individually support the records. The supports are pivoted at intermediate points and can be tilted downwardly toward the front to move the records outwardly for easy accessibility. The storage apparatus also includes unique wire dividers between the records which effectively separate adjacent records from one another regardless of their size. An indexing mechanism is mounted on the storage container for selectively tilting any one of the elongate supporting members downwardly to facilitate removal of a selected record.

INVENTOR.
ROBERT J. NOTES

BY

Allen D. Gutchess, Jr.
his atty

INVENTOR.
ROBERT J. NOTES

BY

Allen D. Gutchess, Jr.
his atty

APPARATUS FOR STORING PHONOGRAPH RECORDS

This invention relates to phonograph record storage apparatus and particularly to such apparatus having improved dividers and selecting means for the records.

While a number of types of phonograph record storage racks are known in the art, the present invention provides an improved phonograph storage container or rack having means for providing ready access to any selected record. The storage apparatus includes a plurality of parallel, contiguous, elongate supporting members, one for each record, which are pivoted at intermediate points and can be selectively tilted downwardly to provide access to the records at the front of the rack. Each of the elongate supporting members has a longitudinally extending groove receiving the edge of a record and thereby spacing the record from adjacent ones. The storage apparatus can also include an indexing bar extending across the elongate supporting members and having means to selectively engage and tilt any desired one of the supporting members to enable access to a selected record. The storage apparatus also includes unique dividers for the records which comprise wires of generally L-shaped configuration effective to separate adjacent records of any diameter.

It is, therefore, a principal object of the invention to provide improved phonograph record storage apparatus having the advantages and features outlined above.

Another object of the invention is to provide an improved record storage apparatus having pivoted record supports which can be individually selectively operated to provide ready accessibility to a record carried thereby.

A further object of the invention is to provide phonograph record storage wire dividers therefor capable of effectively separating adjacent records of varying diameters.

Other objects and advantages of the invention will be apparent from the following detailed description of a preferred embodiment thereof, reference being made to the accompanying drawings, in which.

Figures 1, 5:
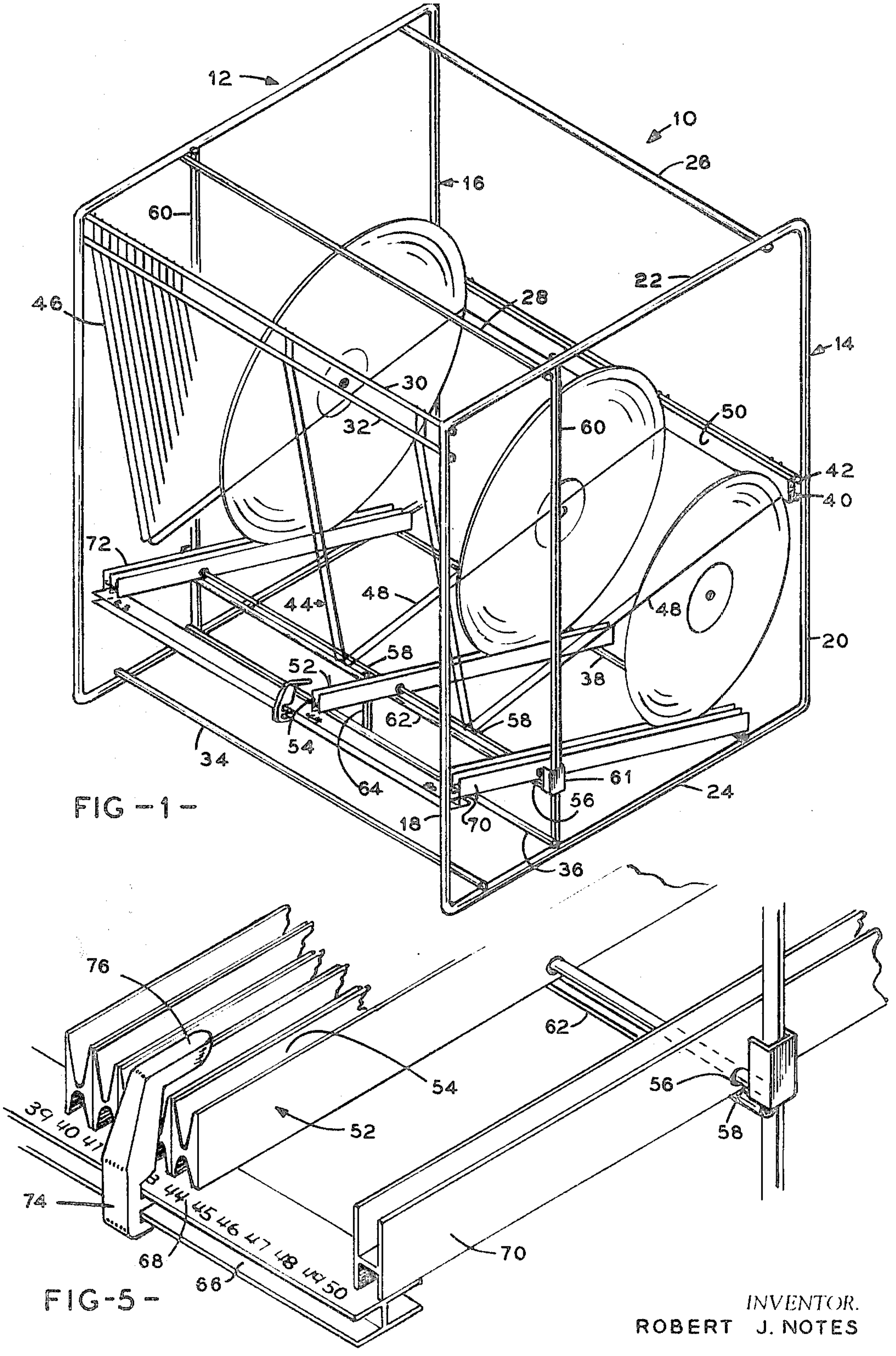
FIG. 1 is a view in perspective of an overall record storage container showing several records of different diameters in stored positions.
FIG. 5 is an enlarged, fragmentary view in perspective of a selecting device for aiding in the removal of any particular record from the storage container.

Referring to FIG. 1, a phonograph record storage container or rack 10 can be used alone or can be either placed in a cabinet or built into a cabinet having an access in front. Use of the container or rack with a cabinet is preferred from the standpoint of dust protection for the records. However, the container 10 is functionally complete by itself.

The container 10 includes a generally cubical wire framework 12 having two rectangular wire end frames 14 and 16 each including side upright frame members 18 and 20 and upper and lower frame members 22 and 24. The frames 14 and 16 are connected in parallel relationship by a plurality of cross frame members 26, 28, 30, 32, 34, 36, 38, 40, and 42. An unobstructed front opening is maintained between the end frames 14 and 16, however.

Figures 2, 3, 4, 5, 6:
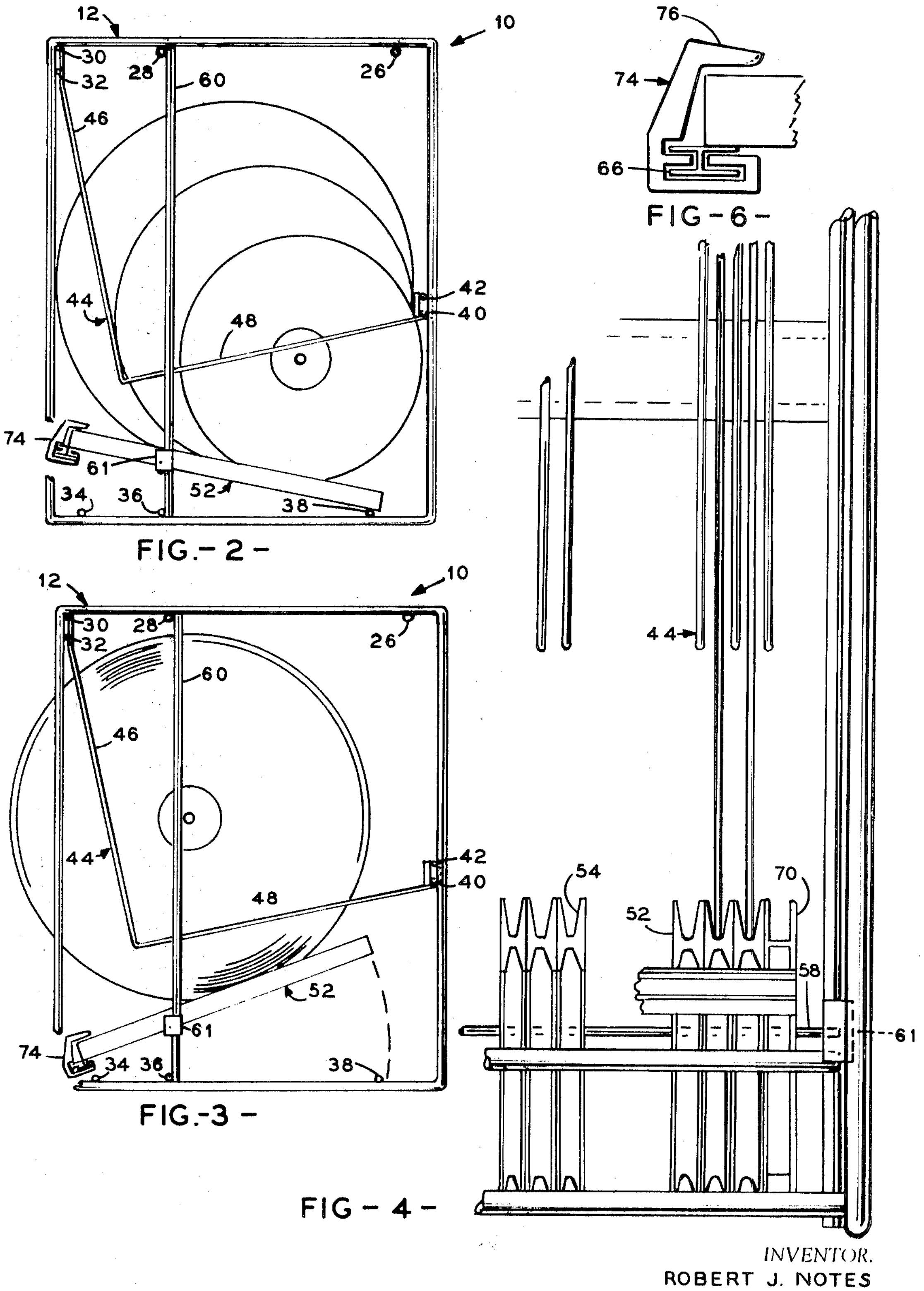
FIG. 2 is a side view in elevation of the record storage container in FIG. 1 with the same records stored therein.
FIG. 3 is a view similar to FIG. 2 but with a record shown being moved to an accessible position.
FIG. 4 is a fragmentary front view of the storage container with two adjacent records in place.
FIG. 6 is a fragmentary side view in elevation of the device of FIG. 5.

A multiplicity of L-shaped wire dividers or separators 44 define adjacent parallel slots or spaces for each of the records, there being 51 of the dividers 44 for 50 records, by way of example. Each of the L-shaped dividers 44 has a generally upright leg 46 and a generally horizontal leg 48. These legs are substantially at right angles to one another with the dividers positioned with the upright legs 46 at about 20° angle to the vertical and with the horizontal legs 48 at about a 20° angle to the horizontal. With this arrangement, as shown in FIG. 2 in particular, the dividers 44 are effective to hold in spaced relationship any commercially available size of record from about 6 inches in diameter to about 12 inches in diameter. The dividers, therefore, while low in cost and easy to manufacture, are most effective in achieving their purpose.

The upper ends of the legs 46 are affixed to the two cross frame members 30 and 32 to maintain the dividers in a vertical plane as viewed from the front of the container 10. The rear ends of the legs 48 are affixed to the lower rear cross frame member 40 at a distance above the support less than the diameter of the smallest record to be stored. A bumper strip or stop 50 is mounted on the two cross frame members 40 and 42 above the divider legs 48 and provides a rear stop and support for the records in the container 10. Any commercially available size record will contact the stop 50 without protruding substantially beyond the back of the container, as shown clearly in FIG. 2.

The records separated by the dividers 44 rest on supporting means preferably in the form of elongate supports 52 having grooves 54 extending longitudinally in the upper surfaces thereof. These grooves 54 are V-shaped so as to center the lower edge portions of the records and thereby to cooperate with the dividers 44 to maintain adjacent records spaced apart at all times, as shown particularly in FIG. 4. The supports 52 can be of extruded aluminum or can be made of plastic, by way of example, in either case being of uniform cross section throughout the entire length since no special stops or other provisions are required at either end thereof.

Intermediate portions of the supports 52 have pivot openings 56 drilled therein which receive a pivot rod 58 extending across the container between intermediate upright frame members 60 of the end frames 12 and 14. All of the records rest on the rear portions of the supports 52. The ends of the rods 58 preferably are loosely mounted for limited vertical movement in brackets 61 affixed to the intermediate frame members 60. An additional intermediate cross frame member 62 extends between the intermediate upright frame members 60, below the pivot rod 58, and serves as a main support for the elongate supports 52, engaging the lower edges thereof. One or more intermediate braces 64, in turn, is connected between the lower cross frame member 36 and the supporting cross frame member 62. This provides the necessary support for the records, the majority of the weight of which is located at this portion of the frame 12.

In order to select any particular record, it is only necessary to depress the front end of the appropriate support 52 to cause the record to roll to the front of the container 10 between the upright legs 46 for easy accessibility.

In a preferred form of the invention, selecting means can be incorporated with the container to facilitate ready selection of a desired record. Accordingly, referring particularly to FIG. 5, a numbered selector bar 66 extends across the container 10, essentially between the end frames 12 and 14, with the bar 66 carrying a numbered strip 68 thereon designating the numbers of the records carried by the elongate supports 52. The bar 66 preferably is affixed to end supporting arms 70 and 72 which extend generally parallelly to the record supports 52 and are also pivotally mounted on the pivot rod 58. In this manner, downward pressure on any portion of the bar causes it to move in an arcuate direction along with the supports 70 and 72.

A selecting pick or pointer 74 is slidably mounted on the bar 66, as shown in FIG. 6, and further facilitates selection of a record. The pointer 74 has a relatively thin extension 76 extending rearwardly and over the front end portions of the elongate supports 52. To select a desired record, the pointer 74 is simply moved to the appropriate record number on the bar 66, this number being determined from a separate record index. When the pointer 74 is properly positioned, the bar 66 is moved downwardly in the arcuate path along with the pointer 74 at which time the pointer extension 76 engages the front end portion of the appropriate one of the elongate supports 52, tilting that support downwardly and causing the record carried thereby to roll to the front of the container. The end of the pointer extension 76 also can serve as a stop for the record to limit the extent of its travel forwardly on the support 52.

It will be seen from the above that the phonograph record storage container embodying the invention incorporates relatively simple dividers which are effective to support records of any commercially available size and effectively maintain adjacent records separate from one another in cooperation with the groove supports 52. Further, as particularly noted in FIG. 2, the overall container 10 requires little more space than that required for the largest diameter records alone. The tiltable elongate record supports facilitate ready removal of a selected record while the selection pointer 74 and bar 66 further facilitate ready selection of a desired record.

Various modifications of the above described embodiment of the invention will be apparent to those skilled in the art, and it is to be understood that such modifications can be made without departing from the scope of the invention.

I claim:

1. Apparatus for storing phonograph records of different diameters comprising means forming a frame having an unobstructed front opening, bottom-supporting means for supporting the records in upright positions perpendicular to the front opening, a plurality of L-shaped dividers for the records having upper ends supported by the frame near the upper edge of the front opening and having rearward ends supported by the frame at the rear and positioned intermediate the top and bottom of the frame, said rearward ends being spaced from said bottom-supporting means a distance less than the diameter of the smallest record to be stored.

2. Apparatus according to claim 1 characterized by said bottom-supporting means having a plurality of grooves extending substantially parallel to said dividers for supporting lower edges of the records, said grooves and said dividers cooperating to space apart all portions of adjacent records.

3. Storage apparatus according to claim 1 characterized by said bottom-supporting means comprising a plurality of elongate supports pivotally carried by said frame, each of said supports being tiltable in a downward direction toward the front opening to enable the record supported thereby to roll toward the front opening for increased accessibility.

4. Storage apparatus according to claim 3 characterized by selecting means mounted near the front ends of said elongate supports to selectively engage and tilt one of said supports.

5. Apparatus for storing phonograph records comprising means forming a frame having a front opening, lower supporting means for supporting the records in upright positions generally perpendicular to the front opening, said supporting means including a plurality of pivotable elongate supports located parallelly to one another and transversely to the front opening, means carried by said frame for pivotally supporting said elongate supports, said supports being tiltable downwardly in a direction toward the front opening to enable selected records to roll toward the front opening for increased accessibility, an indexing bar supported by said frame for up-and-down movement adjacent the front ends of said elongate supports, and means movable longitudinally of said bar for selectively engaging any one of said elongate supports and for tilting said engaged support downwardly when said indexing bar is moved downwardly.

6. Storage apparatus according to claim 5 characterized by said indexing bar being supported by said frame through spaced supporting arms connected to said indexing bar and pivotally supported by said frame to enable said bar to move up and down in an arcuate path adjacent the front ends of said elongate supports, said means movable longitudinally of said bar comprising a selecting pointer having a portion slidably mounted on said bar and having a relatively thin extension extending above the front ends of said supports, said extension being engageable with a selected one of said elongate supports when said bar and said pointer are moved downwardly to cause the engaged one of said elongate supports to tilt downwardly and enable a record carried thereon to roll toward the front end thereof.

7. Apparatus for storing phonograph records comprising means forming a frame having a front opening, lower supporting means for supporting the records in upright positions generally perpendicular to the front opening, said supporting means including a plurality of pivotable elongate supports located parallelly to one another and transversely to the front opening, each of said elongate supports having an upper groove extending longitudinally thereof to receive a lower edge of a record and to maintain the lower edges of adjacent records in spaced relationship, and means carried by said frame for pivotally supporting said elongate supports, said supports being tiltable downwardly in a direction toward the front opening to enable selected records to roll toward the front opening for increased accessibility.

8. Apparatus according to claim 7 characterized further by a plurality of L-shaped dividers carried by said frame and cooperating with said grooved supports to maintain adjacent records in spaced relationship, even though of widely varying sizes.

9. Apparatus for storing phonograph records comprising means forming a frame having a front opening, lower supporting means for supporting the records in upright positions generally perpendicular to the front opening, said supporting means including a plurality of pivotable elongate supports located parallelly to one another and transversely to the front opening, means carried by said frame for pivotally supporting said elongate supports, said supports being tiltable in a direction toward the front opening to enable selected records to roll toward the front opening for increased accessibility, a single selecting pointer having a portion normally spaced from said elongate supports, and means associated with said frame for supporting said pointer for movement transversely of said elongate supports to enable said pointer portion to be selectively positioned to engage any one of a plurality of said elongate supports, whereby said pointer portion can engage the selected elongate support and cause the selected support to tilt downwardly toward the front opening.